Dec. 14, 1937.    N. SCHWARTZ    2,102,037
FILTER TYPE RESPIRATOR
Filed April 21, 1936    2 Sheets-Sheet 1
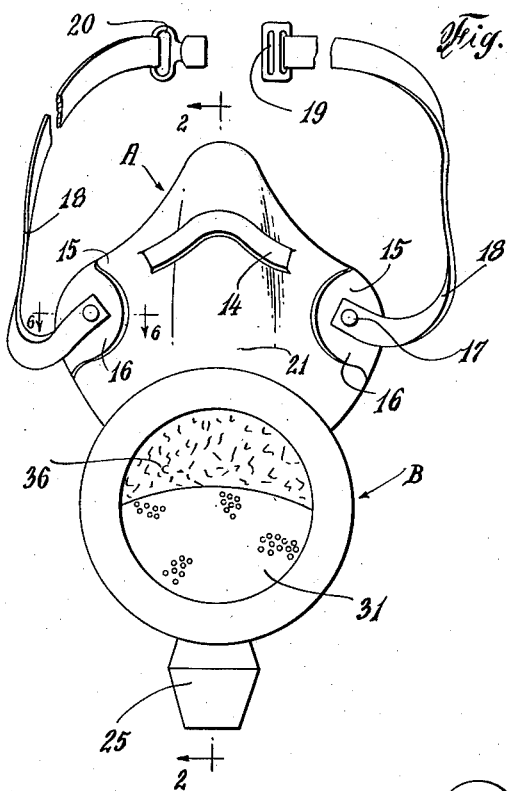
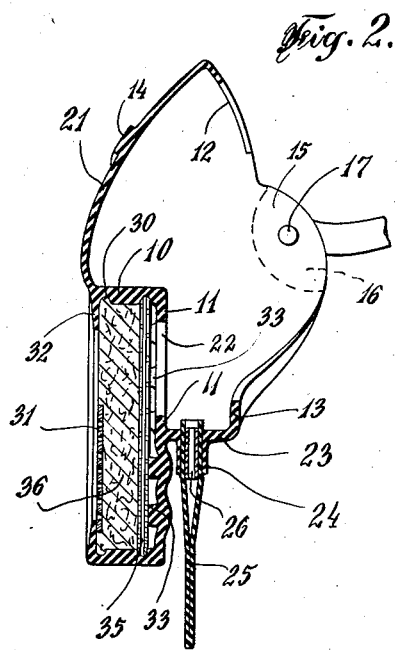
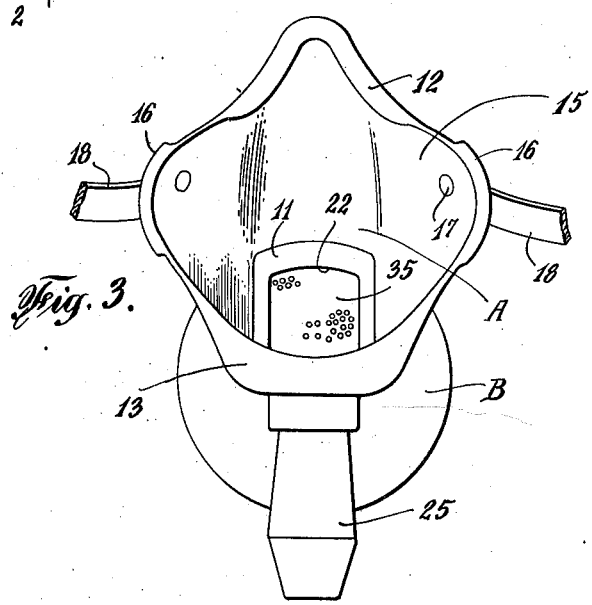
INVENTOR
Nathan Schwartz Dec. 14, 1937.   N. SCHWARTZ   2,102,037
FILTER TYPE RESPIRATOR
Filed April 21, 1936   2 Sheets-Sheet 2
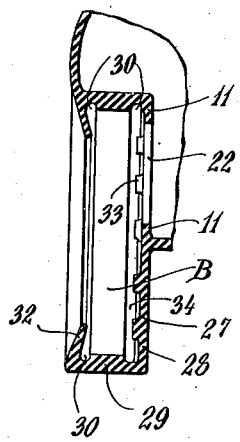
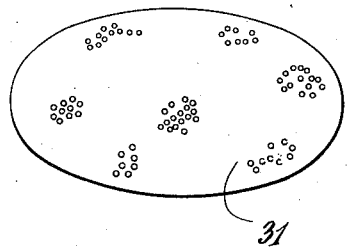
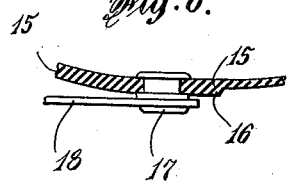
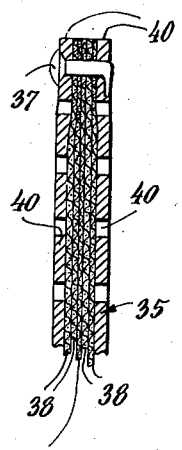
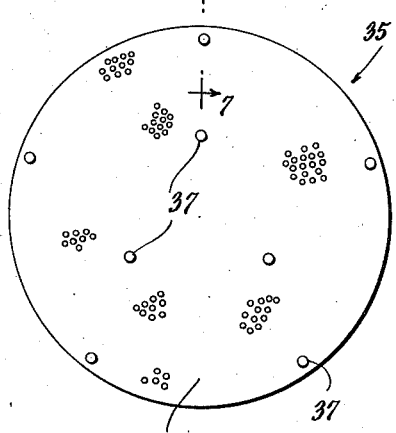
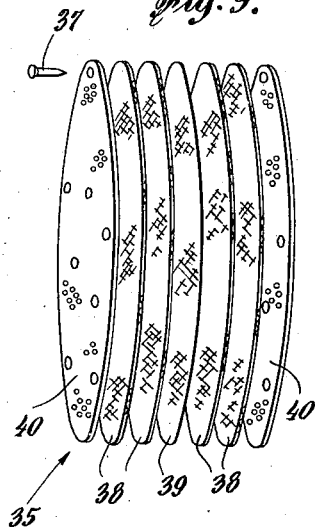
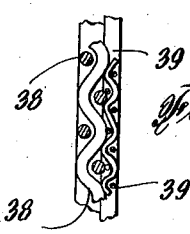
INVENTOR
Nathan Schwartz Patented Dec. 14, 1937

2,102,037

UNITED STATES PATENT OFFICE 2,102,037

FILTER TYPE RESPIRATOR

Nathan Schwartz, New York, N. Y.

Application April 21, 1936, Serial No. 75,579

4 Claims. (Cl. 128—146)

This invention relates to filter type respirators adapted to cover the nose and mouth of the wearer for the purpose of protection against injurious dust fumes and gases, and is a modification of my U. S. Letters Patent No. 2,035,097, and copending patent applications, Serial Numbers, 30,081, 36,957, 44,694, and 52,627.

The object of this invention is to provide improvements in the filter unit construction of the respirator in a manner whereby the filter elements or materials are held firmly and compactly, and also the arrangement, positioning and construction of the filter materials within the said filter unit construction in a manner whereby the said filter materials are most effective in filtering efficiency and in withstanding the additions of chemical neutralizers without deterioration.

Another object is to simplify the means for cleaning, washing and the adding of chemical neutralizers to the filter materials and also to simplify the removal and the reinsertion of said materials.

A further object is to improve the face and nose engaging sections of the face piece of the respirator.

With the above and other objects in view, the invention is more particularly disclosed in the following specification and the accompanying drawings wherein the preferred embodiment exemplifies one form of the invention while the appended claims cover variations and modifications thereof.

In the drawings:

Figure 1 is the front view of the improved respirator.

Figure 2 is a cross section at line 2—2 of Fig. 1.

Figure 3 is a rear view thereof.

Figure 4 is a cross section of the filter unit casing, without including any filter elements or materials.

Figure 5 is a view of the perforated metal span which holds the filter elements compactly in position.

Figure 6 is a cross section of line 6—6 of Figure 1, and shows the thickened cheek section flap of respirator.

Figure 7 is a cross section of the foraminous metal filter on line 7—7 of Figure 8.

Figure 8 is a front view of the foraminous metal filter construction.

Figure 9 is a perspective view of the foraminous metal filter construction, with the multiple filter layers in spaced position.

Figure 10 is a magnified cross section of the foraminous metal filter construction showing the embedding of the textile filter element in the foramina of the adjoining element.

Referring to the drawings by characters of reference the respirator includes a face piece designated generally by the reference A and a filter unit casing designated by the reference character B, the face piece A being preferably constructed of molded rubber or any equivalent flexible material having properties and characteristics of rubber. The casing B is of similar molded construction and is an integral part of the face piece at the horizontal nose covering portion 10, and at the vertical mouth and chin covering portion 11. The rear marginal edge of the face piece A is provided in the region of the nose and chin with inwardly directed angular flanges 12 and 13, the free edges of which flanges are respectively contoured to fit and are adapted for linear contact with the bridge of nose and the chin of the wearer. The outer surface of the face piece is provided with a spanned elevated thickening 14 which extends across the said face piece A. Said elevated span 14 is an integral part of the molded face piece A. The said span 14 is substantially arcuate in shape with its convexity on the upper part, and it reaches from one side of the face piece to the other side and to within proximal distance of the edges thereof. The reason for the elevated span across the face piece of the respirator is to provide a better fit at the flange-engaging portion of the face piece of the respirator. During inspiration a negative pressure is produced within the face piece of the respirator, and due to this pressure the face piece is drawn toward the face of the wearer. While this motion is going on, the flange 12 is pressed against engaging part of the skin, and a better leak proof contact is obtained. The difficult problem in making the face piece engaging-parts leak proof occurs chiefly at the angle of the nose and cheek. Therefore, the thickened elevated span 14 is provided, and due to the increased thickness of the face piece at this portion, there occurs a concentration of negative pressure at the points to where the terminal ends of the span 14 are directed. These terminal ends are in proximal relation to the lower segments of flange 12.

The cheek flap 15 is also reinforced at its outer side by means of an elevation 16 in the molded rubber portion. This is to provide a better hold for the snap fastener 17, which has attached the elastic band 18, to which is attached the slide 19, and the hook 20, by which means the respirator is affixed to the head of the wearer. The reinforcement 16 is also an aid in affixing and holding with firmness the nose and chin flange engaging portions with the face of the wearer.

The face piece also has a substantially vertical nose covering portion 21 and is provided with an opening 22 in the vertical mouth and chin covering portion 11. At the lower part of the mouth and chin covering portion there is a set back 23 which has provided a depending boss 24, which depending boss 24 has inserted an exhalation valve 25, which valve has at its inlet provided an oval shaped metal tube 26, which metal tube keeps the valve in constant readiness for easy exhalation.

The filter unit casing B includes a body 27 and is constructed of molded rubber or an equivalent material. It is an integral part of the face piece of the respirator at the horizontal nose covering portion 10, and at the vertical mouth and chin covering portion 11. The casing B has a rear wall 28, which is in part the vertical mouth and chin covering portion 11, and it has a circumferential wall 29, which has circumferential grooves 30 provided internally, adapted to receive a foraminous metal filter support in the rear groove 30 and an oval perforated metal span 31 in the front groove 30. The perforated metal span 31 is of value to keep the sponge filter material firmly and compactly in the filter casing. The casing B has at its inlet, or anteriorly, an annular inwardly directed marginal flange 32, which marginal flange 32 has an inclination directed towards the circumferential wall 39 and forms an acute angle therewith as illustrated in Figure 4. The rear wall 28 of the casing B has nodular elevations 33 and a defined groove space 34 formed between said nodular elevations. The purpose of the groove space is to provide a continuous air channel between the rear wall 28 and the foraminous metal filter support 35. This air channel leads to the face piece inlet 22, and in this manner the filtration area inlet is enlarged and is equal to the inner circumferential measurement of the rear wall 28 as defined by its circumferential wall 29. It may be mentioned that the greater the area of filtration space the less is the resistance. Therefore less difficulty is experienced in breathing. The casing B is spaced at its interior for the reception of a suitable sponge filter material 36 or an equivalent filter element.

The construction of the foraminous metal filter support 35 is done with a view that it shall fit correctly in the internal groove 30 and that it shall be of sufficient rigidity to hold the casing steady; and also to maintain the air grooves 34 patent and also that its inner filtering layers shall be of material that are resisting to required chemical neutralizers. The said metal filter support 35 is illustrated in the drawings in Figures 7, 8, 9, and 10. Figure 8 is an anterior view, and illustrates the distribution of the wire nails 37 in a manner that provides an even hold on the included multi-filter layers 38 and 39. The multi-filter layers consist of 4 gauze layers 38 or their equivalent divided by means of a silk bolting cloth 39. The reason for this arrangement is that gauze layers have comparatively irregular woven meshes, and the threads are irregularly filamentous. For this reason, should these layers be placed without proper abutting, they would be subject to derangement in certain areas and therefore defective in such areas. This is particularly true in the use of the respirator for protection against fumes and gases, and there is need of neutralizing chemicals for counteracting such fumes and gases. Therefore the following arrangement is most desirable: two perforated metal discs 40, enclosing four gauze layers 38, which are divided by one silk bolting cloth 39 or its equivalent. The principle involved is that the perforated metal and also the silk bolting cloth or silk bolting gauze which is an equivalent have uniform perforations or pores and these pores are steady and firm and withstand the corroding actions of fumes, gases and any chemical neutralizers that may be used. Furthermore, the said pores or perforations are contacted, encroached and embedded by the comparatively soft flexible threads and their filaments. Therefore, the said perforations and pores of the perforated metal and silk bolting cloth obtain a firm contact hold on the soft flexible cotton gauze threads and keep them steadily in proper and required position for proper filtration purposes. It is for this reason that a proper distribution is needed of the wire nails, as illustrated in Figure 8. The wire nails are preferably of the deformable type and are provided with heads. The diameter of the head is slightly larger than that of the metal perforations, and therefore fits snugly in said perforations. The nails are hammered into the perforations and are cut at the pointed side to within $\frac{1}{16}$ of an inch of the perforated metal and then hammered down. In this way a nonleak connection is obtained. The perforations of the metal are about $\frac{1}{32}$ of an inch. In Figure 9 the nail 37 is shown preparatory to its being inserted and hammered onto the metal perforation. In Figure 7 I illustrate the nail inserted and hammered down.

In Figure 8, a perspective view shows the multifilter layers separated from one another, demonstrating how the 2 gauze layers are to be clamped between the perforated metals and silk bolting cloth. It is to be stated that this is a preferred method, and that more layers may be added in proper ratios, if the filter surface area is increased so that breathing is not made unduly difficult.

It should be noticed that all materials used are washable and therefore it is simple to clean and wash the improved respirator. It may be placed under running water, inside and outside, and the water may be allowed to run onto the sponge and the perforated metal filter at the inner side. In the meantime the sponge may be squeezed repeatedly while the said water is running thereon, and thus the cleaning of the improved respirator is accomplished without removal of the filter material or a disturbance of its structure.

It is also to be noticed that the acute angular formation of the annular resilient outer flange 32 with the circumferential wall 29 of the casing B causes a firm and tight hold on the enclosed sponge and also on the metal span 31, which is inserted to clamp the sponge within the casing. The said metal span is perforated and is deformable, therefore it is removable from the said casing even if the annular outer flange is not resilient, that is even if the said flange be rigid. It is also to be noticed that if the said flange be rigid a perforated metal span may not be needed and also if the flange is resilient and it is not desired to have the sponge or equivalent filter material very compact in the casing, the said metal span may then be omitted.

Figure 10 is a highly magnified section of the foraminous metal filter structure, and it is illustrated therein how the soft fibers of the gauze textile filter material embed the foramina of the relatively harder element abutting the textile fiber. The filtering materials used are preferably gauze textile material or an equivalent. Equivalents are suitable meshed cloth, silk, or rayon. The abutting foraminous elements used are metal on the outer sides, or its equivalent, such as hard rubber or plastics. The interior abutments used are preferably silk bolting cloth, or its equivalent grit gauze. Aluminum metal is preferred because it is light and comparatively non-corroding.

It is to be noticed that the average wire nail of the dimension and size that is here used, if hammered into the filter structure and then bent and hammered down, usually breaks. And if it does not break, it is apt to be clumsy or form a position that is apt to injure the person handling same by sticking the fingers. However, if the nail is clipped close to the perforated metal, approximately within $\frac{1}{16}$ of an inch or less, all the possible disadvantages mentioned are thereby eliminated, because when bent and hammered down, it is at the same time embedded into the foraminous metal.

Having thus described my invention I claim as new and desire Letters Patent as follows:

1. A filter type respirator including a face piece adapted to cover the nose and mouth of the wearer, inwardly angularly disposed flanges at the marginal edges of the face piece in the regions of the nose and chin, the free edges of which flanges are adapted for linear contact with the nose and chin and flaps located at opposite sides of the face piece of the respirator and adapted for flat contact with the cheeks and means provided for stiffening said face piece transversely and said means being an integral part of the said face piece.

2. In a filter type respirator adapted to enclose the nose and mouth of the wearer having a filter unit provided and the said filter unit having means provided for removably securing a filter construction consisting of foraminous metals which enclose filter material and the said metals and material are attached one to another and the said filter construction is abutting at its rear side with the rear wall of the filter unit and the said rear wall has button elevations which elevations define air grooves and part of the said rear wall is provided with an opening for connection with the face piece of the respirator.

3. A respirator having a face piece connected with a filter unit having filter material, and a circumferential wall having a side wall and a marginal flange which is disposed at an acute angle with relation to the said circumferential wall, and the said filter material is mounted between the said side wall and the said flange and is in confronting relation to the said side wall and is spaced therefrom.

4. A respirator, a face piece having an inlet port, a filter unit having a circumferential wall with a side wall and a marginal flange disposed at an acute angle with relation to the said circumferential wall, filter material and a foraminous supporting element for the said material, and the said material is in covering relation to the said element and is mounted between the said side wall and the said flange and the said filter unit is connected with the said inlet port at the said side wall.

NATHAN SCHWARTZ.